Sept. 29, 1970                     D. L. GOURLEY                     3,531,752
                        VARIABLE-RESISTANCE THERMAL SWITCH
                              Filed Feb. 9, 1968
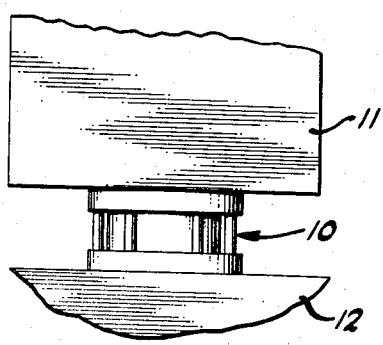
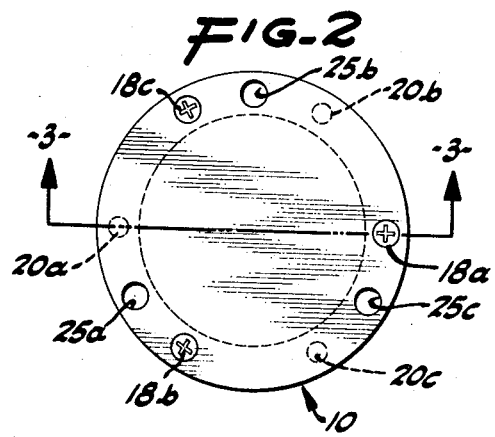
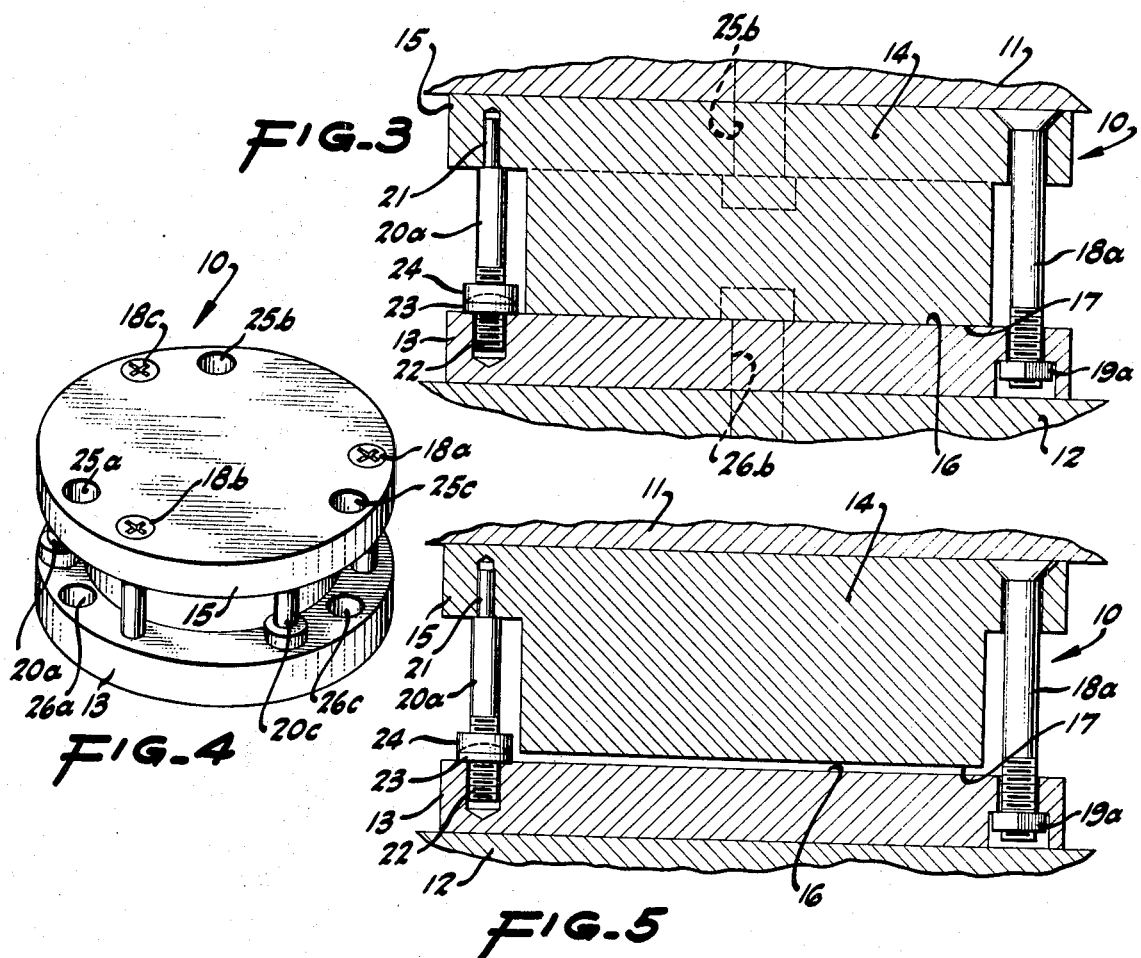
INVENTOR.
DARRELL L. GOURLEY
BY Stanley Bialos,
Homer O. Blair, &
Robert L. Nathans
ATTORNEYS United States Patent Office 3,531,752
Patented Sept. 29, 1970

3,531,752
VARIABLE-RESISTANCE THERMAL SWITCH
Darrell L. Gourley, Santa Clara, Calif., assignor to Itek Corporation, Lexington, Mass., a corporation of Delaware
Filed Feb. 9, 1968, Ser. No. 704,483
Int. Cl. H01h 61/06
U.S. Cl. 337—139                                    15 Claims

ABSTRACT OF THE DISCLOSURE

A thermal switch operative to provide a heat-flow path of variable thermal resistance between a pair of elements one of which generates heat of varying magnitude requiring dissipation by transmission through such path to the other such element. The switch is a tri-metallic structure in which the different coefficients of thermal expansion of the various metals causes a pair of contacts to move relative to each other through a plurality of positions defining different heat-flow resistances in accordance with the magnitude of the heat to be dissipated, and which positions include an open position in which the absolute value of the resistance to heat transfer between the contacts is high and a closed position in which the absolute value of such resistance is low.

---

This invention relates to a thermal switch and, more particularly, to a variable-resistance thermal switch providing a heat-flow path therethrough that changes automatically in the value of the resistance it presents to the passage of heat therealong in inverse correspondence with the magnitude of the heat available for transfer. The switch has utility in many environments in which it is necessary or desirable to conduct heat from one element to another and to vary the resistance to transmission therebetween in accordance with the requirement for heat transfer as, for example, in an effort to maintain the temperature of such one element relatively constant irrespective of changes in the magnitude of the heat developed thereby or otherwise present thereat. An exemplary instance in which such temperature control is advantageous is found in certain of the electrical and optical elements operating on a space craft.

Many types of thermal-responsive devices are well known, and common examples thereof include thermostatically controlled electrical switches and thermostatically controlled valves. In many instances involving such devices, thermal control is derived through the use of bi-metallic components comprised of two metals having different coefficients of thermal expansion. As a consequence of such differences, as ambient or other control temperatures vary above and below some predetermined value, the bi-metallic component is deflected from a pre-established positional correspondence with such temperature value, and such deflection is utilized to actuate a switch, manipulate a valve, or perform some other response function.

So far as is known, however, no thermal-responsive switching devices are available which provide a variable resistance flow path along which heat may be transferred from one location to another, although it is believed that several techniques for accomplishing this result have been investigated including the use of bi-metallic devices, fluid heat conductors, and laminar structures comprising alternate layers of a heat conductive material, such as aluminum, and a high resistance material, such as Mylar, disposed between a pair of metal plates and compressed to varying degrees by the action of a temperature-sensitive bellows. Such investigative techniques and devices have not proved suitable for a number of reasons among which are the relatively large size and weight of the devices, the difficulty of obtaining a sufficiently low resistance to heat transfer when the device is closed or in a minimum-resistance position, and in the case of the fluid heat conductors, the requirement for containment of the fluid within the device.

In view of these difficulties and limitations affecting the suitability of such devices, an object, among others, of the present invention is in the provision of an improved thermal switch automatically operable to provide a variable-resistance heat-flow path in which the capability of such path to transmit heat therealong at any particular time is related to the contemporaneous requirement for heat transfer. As concerns certain other characteristics of the improved switch, it is small, compact and lightweight; it is completely passive requiring no external sensing element, control element or power source and thermostat; the switching point can be conveniently adjusted through a wide temperature range; and the absolute value of the resistance to heat transfer is very low when the switch is closed or in its minimum-resistance position, and quite high when the switch is open or in its maximum-resistance position.

The variable-resistance thermal switch comprising the present invention is a tri-metallic device having a pair of contacts formed of aluminum or other good heat conductive material having a rather large coefficient of thermal expansion and which contacts are movable between a closed, minimum resistance position and an open, maximum-resistance position in accordance with the requirement for heat transfer therethrough. The device further includes spacer structure for establishing the initial position of the contacts or switching point of the device, and such spacer structure is formed of a material, such as Invar, having rather low heat-conductive capabilities and which has also a very low coefficient or thermal expansion. The device also includes tie structure for biasing the contacts toward the initial position thereof, and such tie structure is formed from a third material, such as stainless steel, having rather limited heat-conductive capability and a coefficient of thermal expansion which is substantially less than that of the contacts.

An embodiment of the invention is illustrated in the accompanying drawing in which:

FIG. 1 is a broken side view in elevation illustrating a thermal switch embodying the invention in association with a pair of elements between which heat is to be transferred, such elements being shown diagrammatically in block diagram form;

FIG. 2 is a top plan view of the switch;

FIG. 3 is an enlarged transverse sectional view through the switch taken along the line 3—3 of FIG. 2 and showing the switch in closed position;

FIG. 4 is a perspective view of the switch; and

FIG. 5 is a transverse sectional view similar to that of FIG. 3 but illustrating the switch in the open position thereof.

The thermal switch of the present invention has for its function the provision of a variable-resistance heat-flow path useful between a pair of elements which, in the usual case, will include an operational element characterized by generating or otherwise developing heat during the operating phases thereof. This relationship and use of the switch is shown in FIG. 1 wherein the switch 10 is interposed between a pair of elements 11 and 12, the first of which is an operational component such as an electrical or optical mechanism having both operating and dormant modes and which in its operational mode develops heat that is advantageously dissipated. Such dissipation may be effected, for example, in a static element such as mounting structure for the component 11, and the element 12 may be taken to represent such structure. In the case that it is advantageous to maintain the temperature of the component 11 relatively constant, the capability of the switch 10 to conduct heat from the component 11 to the mounting structure 12 should vary in accordance with the extent to which heat is being generated by the component 11. As suggested hereinbefore, the switch 11 has this variable-resistance capability.

Referring to FIGS. 3 and 5, the switch 10 is seen to include a pair of contacts 13 and 14, the first of which is in the form of a relatively thin cylindrical plate and the second of which is a relatively thick cylindrical solid equipped adjacent its upper end with an outwardly extending annular flange 15 substantially identical in diameter to that of the contact plate 13. As explained in greater detail hereinafter, the contacts 13 and 14 are adapted at certain times to be brought into abutting engagement along the facing surfaces 16 and 17 thereof as shown in FIG. 3, and at other times the surfaces 16 and 17 are adapted to be withdrawn from contact to define the open position of the switch as illustrated in FIG. 5. For the purpose of minimizing the resistance to heat transfer across the surfaces 16 and 17 (i.e., minimize the temperature gradient thereacross), each such surface is flat and polished and may be considered to be a surface of optical flatness.

The contacts 13 and 14 are held together and are biased in a direction urging the surfaces 16 and 17 toward each other by compression-developing tie structure which in the form shown comprises three machine screws 18a, 18b and 18c spaced from each other by equal angular distances. The screws 18 extend downwardly through openings provided therefor in the flange 15 of the contact 14, and the heads of the screws are countersunk, as illustrated. The threaded lower end portions of the screws 18 respectively extend into openings or passages provided therefor in the lower contact 13, and respectively seated within such passings are nuts 19 which threadedly engage the screws 18. As concerns identification of the nuts 19, letter suffixes are used where appropriate to properly associate such nuts with the screws 18. It will be apparent that as the screws 18 are tightened, the contacts 13 and 14 will be urged toward each other so as to force the surfaces 16 and 17 thereof into more intimate engagement.

The switch 10 further includes compression-resisting spacer structure which in the particular device being considered includes a plurality of posts or columns, there being three in number equally spaced in an angular sense and respectively denoted with the numerals 20a, 20b and 20c. As shown in FIG. 2, the spacer posts 20 are symmetrically oriented relative to the screws 18 and are positioned therebetween at equal angular distances. Each post at its upper end is restricted in cross section, as shown at 21, and is freely receivable within a bore or passage provided therefor in the flange 15 of the contact 14. Adjacent its lower end, each post 20 is threaded, as indicated at 22, and the threaded ends thereof are freely received within openings or bores afforded for this purpose in the contact 13.

Associated with each post 20 is a hemispherical washer 23 and hemispherical nut 24 which together define a type of ball and socket joint. Such joint is adapted to accommodate dimensional and other structural discrepancies in the switch while transmitting compressive forces along the axes of the posts 20 which are essentially normal to the surfaces 16 and 17 and tend to separate the contacts 13 and 14. In this respect, each nut 24 threadedly engages the end 22 of the associated post 20 and is tightened downwardly against the washer 23 which is carefully finished along its undersurface. Similarly, the shoulder defined by each post at the mergence of the end portion 21 of reduced close section thereof with the remainder of the post is carefully finished, and because such shoulders engage the flange 15 along its undersurface, each post develops an axial force therealong as the nut 24 is tightened, which force limits movement of the contacts 13 and 14 toward each other under the influence of the tie structure defined by the screws 18. It will be appreciated that the extent of such limiting force and the initial position of the contacts 13 and 14 can be adjusted by proper positioning of the nuts 24; and as each nut is moved downwardly along the post 20 it effectively lengthens the same which tends to increase the spacing between the contacts, and vice versa.

The switch 10 may be secured to the elements 11 and 12 in any convenient manner, and in the particular device being considered, the contact 14 is provided with a plurality of openings 25a, 25b and 25c adapted to pass screws or similar fasteners therethrough, as shown in FIG. 3, which enter threaded openings provided therefor in the component 11 (or in the mounting structure 12 if the switch is inverted) to fixedly secure the switch thereto. As shown in FIGS. 2 and 4, the openings 25 are spaced from each other by equal angular distances and are respectively interposed between successive posts 20 and screws 18. In an analagous manner the contact 13 is provided with a plurality of openings 26 (the letter suffixes being used where appropriate), which openings are used to secure the switch to the component 12 as shown in FIG. 3.

It will be clear from the foregoing that the switch 10 comprises three structural assemblages respectively constituting the contacts 13 and 14, tie structure comprising the screws 18 and nuts 19, and spacer structure comprising the post 20, washers 23 and nuts 24. These assemblages are formed of dissimilar materials which differ from each other with respect to their resistance to heat conductivity and with respect to the characteristics of their thermal expansion. More paricularly, the contacts 13 and 14 are formed of a material that has an inherently low resistance to heat conductivity and which also has a relatively high coefficient of thermal expansion. A material having these features which has been found to be satisfactory is aluminum, and as concerns its coefficient of thermal expansion, it is usually taken to be $24 \times 10^{-6}$ per degree centigrade at a standard temperature of about 20° C.

It will be apparent that when the switch contacts 13 and 14 are open, as shown in FIG. 5, heat will be conducted between the contacts via the screws 18 and spacers 20 and, accordingly, materials having a relatively low capability of conducting heat therethrough are advantageously used for these assemblages. Thus, the tie structure is formed of material that provides a fairly high resistance to the transfer of heat therethrough and which at the same time has a relatively low coefficient of thermal expansion referenced to the aluminum contacts 13 and 14. A material that is satisfactory is stainless steel, and steel has a coefficient of thermal expansion usually taken to be $11 \times 10^{-6}$ per degree centigrade at a standard temperature of about 20° C. The material selected for the spacer structure has an even greater resistance to the transmission of heat therethrough and a very low coefficient of thermal expansion. In this respect, a material satisfactory for use is Invar and such alloy having the standard component percentages of about 64% steel and 36% nickel has a coefficient of thermal expansion in the range of about $-0.3 \times 10^{-6}$ to $+2.5 \times 10^{-6}$ per degree centigrade at a standard temperature of about 20° C.

In using the switch 10, initial assembly thereof is ordinarily effected at room temperature, and the three spacer posts 20 with the nuts 24 and washers 23 thereon are inserted into the opening provided therefor in the contact 13. The contact 14 is then placed in position by inserting the restricted end portions 21 of the posts into the respective openings therefor in the flange 15. The nuts 24 can then be adjusted so as to bring the surfaces 16 and 17 of the contacts into abutment. The three screws 18 are then assembled with the contacts 13 and 14 and nuts 19, and the screws are tightened until the initial desired contact force between the surfaces 16 and 17 is obtained. As concerns such contact force, it will be evident that it determines the initial position of the contacts and switching temperature for the switch, and by correlating the adjustment of the nuts 24 with the tension in the screws 18, the switching temperature can be changed to any desired value within the range of the switch.

At the initial setting of the switch, the contacts 13 and 14 are closed so that heat can be conducted across the surfaces 16 and 17 thereof at a resistance defined essentially by the contact pressure or abutment force of the surfaces. The total resistance to heat transfer at such setting of the switch is essentially the sum of the contact resistance and the inherent resistance of the contacts 13 and 14 (the conductive contribution made by the screws 18 and spacers 20 being neglected). The contact resistance is a function of the roughness of the surfaces 16 and 17, the hardness thereof and the contact pressure defined therebetween. As explained heretofore, the surfaces are highly polished to reduce roughness and they may be hardened, and the net effect is to have a very low contact resistance, wherefore the effective resistance is essentially the inherent resistance of the contacts when they are completely closed, i.e., the contact pressure is high.

As the temperature of the switch 10 is reduced below the temperature setting therefore, the contacts 13 and 14 each contract and the extent of their contraction is significantly greater than the associated contraction of the spacers 20 because of the difference in the two coefficients of thermal expansion, which difference is in the order of about 18 to 1. As the temperature of the switch continues to be reduced, the differential contraction between the contacts and spacer structure continues until a point is finally reached at which the contact pressure between the surfaces 16 and 17 is reduced to zero and the surfaces commence to retract from each other. At this time the switch is open, as shown in FIG. 5, and no heat is conducted therethrough except for that which flows between the contacts 13 and 14 via the spacer structure and tie structure which, in each instance, is relatively low. Once the switch is open, then, the resistance to heat flow remains substantially constant and the absolute value of such resistance is quite high.

Now, if the temperature of the switch increases, the contacts 13 and 14 expand to bring the surfaces 16 and 17 thereof into contact, and the contact pressure increases with temperature until the temperature is reached for which the switch was initially set, i.e., the switching point. Continued heating of the switch beyond this point progressively increases the contact pressure between the surfaces 16 and 17 as a consequence of the differential expansion of the contacts 13 and 14 and the spacer structure until a temperature is reached at which the contact resistance to heat transfer is essentially zero. Thereafter, any further elevation in the temperature of the switch does not alter the contact resistance which, then, remains substantially constant and the absolute value thereof approximates zero. In a particular switch 10, the zero contact resistance is attained at a temperature of about 27° C. above the switching point.

The switch 10 cycles automatically through the switching point in accordance with its temperature which, quite evidently, is a function of the temperature of the elements 11 and 12 to which the switch is connected. Thus, as the temperature of the element 11 progressively increases, the resistance of the heat-flow path through the switch 10 automatically decreases until a temperature is reached at which the resistance to heat transmission through the switch approximates zero (i.e., the inherent resistance of the contact material). Conversely, as the temperature of the element 11 progressively decreases, the resistance of the heat-flow path through the switch increases automatically until a temperature is reached at which the resistance is maximum, as defined by the open condition of the contacts 13 and 14. There will be very little hysteresis upon cycling of the switch through the switching temperature because the contacts, tie structure and spacer structure all operate well within the limits of their elastic deformation.

The arcuate surfaces provided by each nut structure comprising a washer 23 and nut 24 have been described hereinbefore as being hemispherical although the actual extent of each such surface is somewhat less than a hemisphere. Further, although the best results are attained when the surfaces are segments of spheres, deviation from such geometric form is acceptable in many instances. Thus, such connection may be though of generally as a ball and socket type of joint. The opposing portions of the contacts 13 and 14 through which the fasteners 18 and posts 20 are operative may be considered to be abutments since the posts 20 actually bear thereagainst although the contact surface of the contact 13 can be considered to be coextensive with the contact surface 17 in which event the contact 13 along its outer cylindrical edge portion provides a flange which is oriented in opposing relation to the flange 15 of contact 14.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A variable-resistance thermal switch, comprising a pair of heat-conductive contacts respectively adapted to be connected with a pair of components so as to conduct heat therebetween and being provided with a pair of contact surfaces movable relative to each other through positions of varying thermal resistance in accordance with the requirement for heat transfer between such components, tie structure interconnecting said contacts and applying a force thereto tending to urge said surfaces toward a minimum-resistance position, and spacer structure connected with said contacts in force opposition to said tie structure and determining therewith the initial position of said surfaces and the switching point of said switch, the coefficient of thermal expansion of said contacts being effective to move said surfaces thereof toward such minimum-resistance position as the temperature across said contacts increases and vice versa.

2. The thermal switch of claim 1 in which said spacer structure includes means for adjusting the same to change selectively the switching point of said switch.

3. The thermal switch of claim 1 in which said tie structure includes a plurality of fasteners operative in tension across said contacts to urge said surfaces toward the minimum-resistance position thereof.

4. The thermal switch of claim 1 in which said spacer structure includes a plurality of posts operative in compression between said contacts in opposition to said tie structure.

5. The thermal switch of claim 1 in which said tie structure is compression-developing structure urging said surfaces in a direction toward each other, and in which said spacer structure is compression-resisting structure tending to limit movement of said surfaces in such direction toward each other.

6. The thermal switch of claim 5 in which said spacer structure includes means for adjusting the same to change selectively the switching point of said switch.

7. The thermal switch of claim 1 in which said surfaces are oriented in facing relation and are relatively movable in directions toward and away from each other, in which said tie structure includes a plurality of fasteners operative in tension across said contacts to urge said surfaces toward the minimum-resistance position thereof, in which said contacts are provided with spaced-apart abutments disposed in facing opposition, and in which said spacer structure includes a plurality of posts extending between said abutments and being operative in compression thereagainst to oppose the compressive force imparted to said contacts by said tie structure.

8. The thermal switch of claim 1 in which said contacts, tie structure and spacer structure are comprised of materials having a plurality of coefficients of thermal expansion related so that the resistance to heat conductivity defined by said contacts changes automatically in accordance with the temperature difference across said switch so as to effect the aforesaid increase and decrease in the heat transfer capability of said switch.

9. The thermal switch of claim 8 in which said contacts and said spacer structure have different coefficients of thermal expansion with that of said contacts being much greater.

10. The thermal switch of claim 8 in which said switch is a tri-metallic element with said contacts, tie structure and spacer structure being formed of materials all having different coefficients of thermal expansion.

11. The thermal switch of claim 10 in which the coefficient of thermal expansion of said contacts is much greater than that of said spacer structure.

12. The thermal switch of claim 11 in which said contacts are aluminum, said tie structure stainless steel, and said spacer structure Invar.

13. The thermal switch of claim 11 in which said surfaces are oriented in facing relation and are relatively movable in directions toward and away from each other, in which said tie structure includes a plurality of fasteners operative in tension across said contacts to urge said surfaces toward the minimum-resistance position thereof, in which said contacts are provided with spaced-apart abutments disposed in facing opposition, and in which said spacer structure includes a plurality of posts extending between said abutments and being operative in compression thereagainst to oppose the compressive force imparted to said contacts by said tie structure.

14. The thermal switch of claim 13 in which said fasteners and said posts are adjustable to change selectively the switching point of said switch.

15. The thermal switch of claim 14 in which each of said posts has a threaded portion therealong and is equipped with nut structure including a nut adjustably mounted upon the associated post and a washer freely movable therealong and being in engagement with an abutment of one of said contacts, each such nut and washer having arcuate surfaces in engagement with each other to define a ball and socket joint through which compressive force developed along the associated post is transmitted to the contact in engagement with such washer at a generally normal disposition relative to the abutment bearing thereagainst.

References Cited
UNITED STATES PATENTS

| 428,482 | 5/1890 | Guss | 337—394 |
|---|---|---|---|
| 2,664,481 | 12/1953 | Pearl et al. | 337—139 |

BERNARD A. GILHEANY, Primary Examiner

R. L. COHRS, Assistant Examiner

U.S. Cl. X.R.
337—123, 182, 394